Nov. 30, 1937.   W. W. MOORE   2,100,550
EMERGENCY SHUT-OFF VALVE
Filed Nov. 20, 1934

Wesley W. Moore
INVENTOR

BY R. J. Dearborn
HIS ATTORNEY

Patented Nov. 30, 1937

2,100,550

UNITED STATES PATENT OFFICE 2,100,550

EMERGENCY SHUT-OFF VALVE

Wesley W. Moore, Hobbs, N. Mex., assignor to The Texas Company, New York, N. Y., a corporation of Delaware Application November 20, 1934, Serial No. 753,815

4 Claims. (Cl. 137—153)

This invention relates to shut-off valves, more particularly to a valve for shutting off a heavy oil or gas engine in an emergency and in the event that the regular governing mechanism should fail to function.

In the use of large internal combustion engines of the Diesel or semi-Diesel type, such as are often used in the pumping of oil wells, it is not infrequent that overspeeding will occur due to any one of several causes such as the breaking of the pump rods or the breaking of a drive belt, and on such occasions if the regular governing mechanism of the engine should stick or otherwise fail to operate the engine may run away and in all probability be ruined or materially damaged due to the excessive speed.

The principal object of this invention is to provide a shut-down device which is positive in operation and entirely independent of all other governing mechanisms.

Another object of the invention is to provide a shut-off valve which is held in its open position by gravity alone with no tightly fitting guides or bushings to create friction or drag and no springs or other complicated mechanism to get out of adjustment.

In carrying out the invention a valve has been provided for the air intake of a gas or oil engine, which valve is suspended and held open by its own weight while it is adapted to be closed by the sudden rush of air through the intake caused by the speeding up of the engine in an emergency. As the valve is sucked toward and approaches its closed position a stop member supported by the valve stem is snapped to its holding position, thus preventing the valve from again opening.

Figure 1:
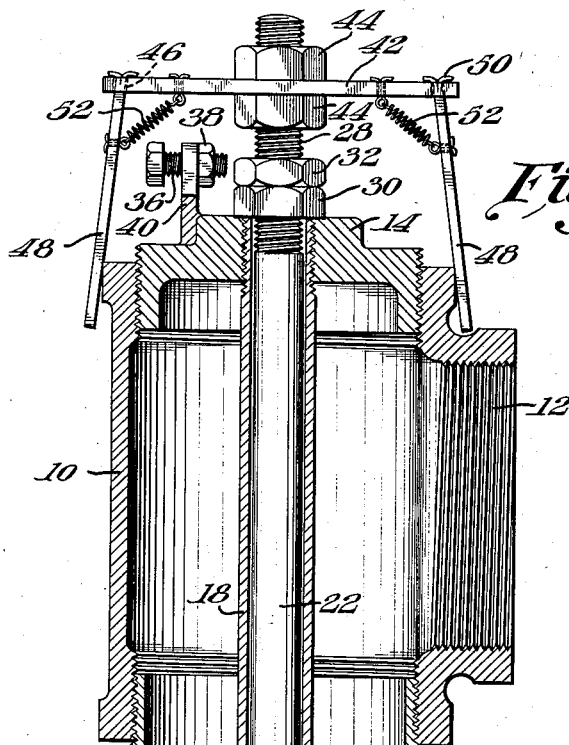
Figure 2:
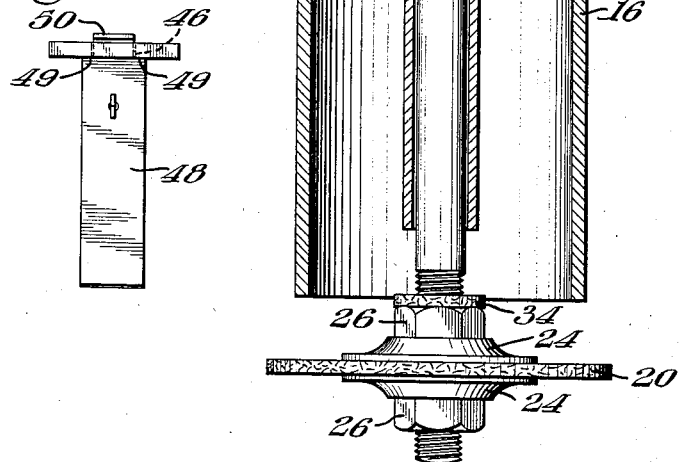

For a better understanding of the invention, reference may be had to the accompanying drawing in which Figure 1 is a vertical sectional elevation of a valve embodying the invention while Figure 2 is a side view of the device for holding the valve in its closed position.

Referring to the drawing, a housing 10 has been provided, this housing having a threaded opening 12 adapted to be connected to the air intake of an internal combustion engine. As shown in Figure 1, the housing 10 is in the form of a pipe T and a bushing 14 is threaded into its upper end. A short piece of pipe forming an extension 16 forms part of the housing 10 and is threaded into the lower opening of the housing. The housing is intended to be attached to the air intake or intake conduit of an engine in such a way that it will remain in a vertical position as shown in Figure 1.

A tubular bushing member 18 is secured at its upper end to the bushing 14 by threading it into an opening provided for that purpose, the member 18 extending downwardly to a point slightly above the lower end of the pipe extension 16. A valve 20 which may be of leather or some other suitably flexible material is secured to the lower end of a valve stem 22 by means of a pair of washers 24 and suitable nuts 26. The valve stem 22 extends upwardly through the tubular member 18 and is provided at its upper end with threads 28. An adjusting nut 30 and a lock nut 32 are threaded to the valve stem 22 and are adjusted so that the valve 20 will normally assume a position below and slightly spaced from the lower end of the pipe extension 16. A soft fiber washer 34 is secured to the lower end of the valve stem 22 in a position such that it will engage and close the lower end of the tubular bushing member 18 when the valve 20 is in its closed position, that is, in engagement with the lower end of the pipe extension 16. A cap screw 36 having a lock nut 38 is mounted in a bracket 40 secured to the bushing 14 and can be adjusted to lock the valve 20 in its open or lower position.

In order to lock the shut-off valve in its closed position after it has once been closed, an arm 42 is secured to the upper end of the valve stem 22 by means of a pair of nuts 44, the arm extending laterally of the valve stem.

The extremities of the arm 42 are provided with openings 46 and suspended from the arm through these openings are a pair of stop members 48 comprising short metal rods or strips. As shown in Figure 2 the stop members are provided with shoulders 49 serving to prevent upward movement of the stop members through the openings 46. In order to prevent the stop members 48 from slipping downwardly through the openings 46 the upper ends of the stop members are preferably split and bent over as is shown at 50. The openings 46 are slightly wider than the thickness of the stop members 48 so that the stop members may swing freely from the arm 42. A pair of coil springs 52 are attached to the arm 42 and the stop members 48 and serve to urge the lower ends of the stop members inwardly. The stop members 48 are of a length such that when the valve 20 is in its lower or open position they will rest against the upper end of the housing 10 as is shown in Figure 1.

In operation, when the internal combustion engine is running at or below normal speed, gravity will hold the valve 20 in its lower or open position. In case the engine starts to run faster than the normal speed the air being sucked into the air intake through the housing 10 will cause the valve 20 to oscillate slightly in accordance with the air impulses. These oscillations will increase in magnitude as the speed increases and when the normal speed has been exceeded by about 25% the oscillations will have increased sufficiently to allow the stop members 48 to snap inwardly against the bushing 14 and rest upon the top of the housing 10. The length of the stop members 48 and the adjustment of the arm 42 with respect to the valve stem 22 will be such that when the stop members snap inwardly the valve 20 will be held tightly against the lower end of the pipe extension 16. Successive revolutions of the engine will only cause the valve to seat tighter and without air for combustion the engine will soon stop. When the valve 20 has been closed the washer 34 will engage and close the lower end of the tubular member 18 thus preventing air from passing downwardly through the tubular member and into the engine.

The clearance or normal valve opening may be delicately regulated by means of the adjusting nut 30 so that the valve will remain quiet at the normal operating speed but will start oscillating with the air impulses at a slight increase in speed above normal.

From the foregoing description it will be seen that a shut-off valve has been provided in which the valve is held in its open position by gravity alone thus obviating the use of springs or other attachments. When the valve has once been closed it will obviously be impossible for it to open unless the stop members 48 are moved outwardly by hand against the tension of the coil springs 52.

Obviously, many modifications and variations of the invention, as hereinbefore set forth, may be made without departing from the spirit and scope thereof, and therefore only such limitations should be imposed as are indicated in the appended claims.

I claim:

1. A shut-off valve for an internal combustion engine comprising a housing having an inlet opening and an outlet opening adapted to be attached to the air intake of said engine, a vertically movable valve adapted to seat upon said housing around said inlet opening when said valve is in its closed position, a valve stem attached at its lower end to said valve and extending upwardly through said housing, said valve being held normally in its open position by gravity, and latch means attached to the upper end of said valve stem for holding said valve in its closed position when said valve has been raised due to a sudden rush of air around the valve and through said housing produced by an abnormal increase in the suction of said engine.

2. A shut-off valve for an internal combustion engine comprising a vertically disposed housing having an inlet opening in its lower side and an outlet opening in its upper portion, the lower end of said housing forming a valve seat around said inlet opening, a vertically movable valve adapted to cooperate with said seat, slidable means for suspending said valve below said seat, said valve being normally held in its open position by gravity and the arrangement being such that an abnormal increase in the suction of said engine will cause a sudden rush of air into said housing around said valve and through said inlet opening to raise said valve to close said inlet opening, and spring actuated means actuable upon upward movement of said valve for locking said valve in its closed position.

3. A shut-off valve for internal combustion engines comprising a vertically disposed housing having an inlet opening in its lower side and an outlet opening in its upper portion, a valve seat around said inlet opening, a vertically movable valve adapted to cooperate with said seat, slidable means for suspending said valve below said seat, said valve being normally held in its open position by gravity and the arrangement being such that a sudden rush of air into said housing through said inlet opening will raise said valve to close said inlet opening, and means for holding said valve in a fixed position when said valve has been closed, said holding means comprising an arm secured to said slidable means, a stop member pivotally mounted at its upper end on said arm, and resilient means for forcing the lower end of said stop member into locking engagement with said housing when said valve reaches its closed position.

4. A shut-off valve for internal combustion engines comprising a housing having an inlet opening in its lower side and an outlet opening adapted to be attached to the air intake of said engine, a vertically movable valve adapted to seat upon said housing around said opening when in its closed position, a valve stem attached at its lower end to said valve and extending upwardly through said housing, a tubular bushing member attached at its upper end to said housing and extending downwardly around a portion of said valve stem, means attached to the upper end of said valve stem for holding said valve in its closed position when said valve has been raised due to a sudden rush of air through said housing, and a soft, fiber washer attached to said valve and adapted to engage and close the lower end of said tubular bushing member when said valve is in its closed position.

WESLEY W. MOORE.